(12) United States Patent
Noda et al.

(10) Patent No.: US 8,478,564 B2
(45) Date of Patent: Jul. 2, 2013

(54) SHAPE MEASURING APPARATUS

(75) Inventors: Takashi Noda, Shimotsuke (JP); Kenji Ueda, Kawasaki (JP)

(73) Assignee: Mitutoyo Corporation, Kanagawa (JP)

( * ) Notice: Subject to any disclaimer, the term of this patent is extended or adjusted under 35 U.S.C. 154(b) by 309 days.

(21) Appl. No.: 12/878,204

(22) Filed: Sep. 9, 2010

(65) Prior Publication Data

US 2011/0066400 A1    Mar. 17, 2011

(30) Foreign Application Priority Data

Sep. 15, 2009   (JP) ................................. 2009-212734

(51) Int. Cl.
G01B 5/20    (2006.01)

(52) U.S. Cl.
USPC ............. 702/168; 702/86; 702/150; 702/167; 702/189

(58) Field of Classification Search
USPC ..... 702/86, 150, 167, 189; 600/463; 348/142; 331/549, 555, 833; 324/755.11
See application file for complete search history.

(56) References Cited

U.S. PATENT DOCUMENTS 6,344,656 B1 * 2/2002 Hopkins et al. .......... 250/559.22
7,392,692 B2 * 7/2008 Noda .............................. 73/105

FOREIGN PATENT DOCUMENTS

JP    63-131016    6/1988
JP    2005-345123    12/2005

* cited by examiner

Primary Examiner — Elias Desta
(74) Attorney, Agent, or Firm — Greenblum & Bernstein P.L.C.

(57) ABSTRACT

A 3D measuring apparatus includes a probe that has a spherical gauge head for measuring a measured object; a motion mechanism that holds and moves the probe; and a motion controller that controls the motion mechanism. The controller includes a contact point obtainer that obtains a contact point location of a surface of the measured object and the gauge head based on a central location of the gauge head; a radius of the gauge head; and a swing amount of the gauge head. The controller also includes a motion commander that calculates a location command value causing the motion mechanism to move the probe, based on the contact point location obtained by the contact point obtainer.

8 Claims, 6 Drawing Sheets

SHAPE MEASURING APPARATUS

CROSS-REFERENCE TO RELATED APPLICATIONS

The present application claims priority under 35 U.S.C. §119 of Japanese Application No. 2009-212734, filed on Sep. 15, 2009, the disclosure of which is expressly incorporated by reference herein in its entirety.

BACKGROUND OF THE INVENTION

1. Field of the Invention

The present invention relates to a shape measuring apparatus.

2. Description of Related Art

Conventionally, a shape measuring apparatus is known, that includes a probe having a gauge head contacting a measured object and configured to move the gauge head within a predetermined area; a motion mechanism moving the probe; and a controller controlling the motion mechanism; and that measures a shape of the measured object by moving the gauge head along a surface of the measured object while pressing the gauge head against the measured object (see Related Art 1, for example). In a 3D measuring apparatus (shape measuring apparatus) described in Related Art 1, a motion controller (control apparatus) has an autonomous following vector generator that generates a speed vector for moving a gauge head along a surface of a measured object while the gauge head is pressed against the measured object.

FIG. 4 illustrates a state where a gauge head 100 is moved along a surface of a measured object 110 having a circular truncated cone shape. As shown in FIG. 4, an autonomous following vector generator provides a coordinate system for measuring the shape of the measured object 110, having a Z axis for a central axis of the measured object 110; and an X axis and a Y axis that orthogonally intersect with the Z axis. In the following description, an example is given where, within a constraint plane S (two-dotted chain line in FIG. 4) having a constant coordinate value $Z_h$ in the Z axis direction (i.e., height direction of the measured object 110), the gauge head 100 is moved along the surface of the measured object 110 so as to measure the shape of the measured object 110 at value $Z_h$ on the Z axis coordinate. In FIG. 4, a locus LS of points to be measured is shown in a two-dotted chain line. Also in FIG. 4, in order to simplify the figure, the above-described Z axis coordinate value $Z_h$ and other portions of symbols used in the following equations are omitted.

The autonomous following vector generator generates a speed vector $V_P$ related to a progressive direction of the following probe as shown in equation (1) below, by having a press-in direction of the gauge head 100 against the measured object 110 (in other words, swing direction of the gauge head 100 when the gauge head 100 is pressed against the measured object 110) (hereinafter referred to as swing direction) as a normal direction at a contact point of the surface of the measured object 110 and the gauge head 100.

$$\vec{V}_P = V_s \cdot \vec{P}_u \quad (1)$$

In this example, $V_s$ is a parameter for controlling the speed of the progressive direction. For example, when the swing direction or, deviation from the target value in the height direction becomes large, $V_S$ is set small. Vector $P_u$ is a unit vector of vector P, and is obtained from the following equations (2) and (3).

$$\vec{P}_u = \frac{\vec{P}}{|\vec{P}|} \quad (2)$$

$$\vec{P} = \vec{E} \times \vec{Z}_u \quad (3)$$

In equation (3) above, operator × shows an outer product of the vector. Accordingly, vector P is an outer product of vector E based on the swing amount of the gauge head 100; and unit vector Zu in the Z axis direction.

Further, the autonomous following vector generator generates speed vector $V_E$ related to the swing direction as shown in the following equation (4).

$$\vec{V}_E = V_e \cdot (|\vec{E}| - E_0) \cdot \vec{E}_u \quad (4)$$

In this example, $V_e$ is a parameter for controlling the speed in the swing direction. $E_0$ is a standard swing amount of a following probe, which is a target value in the swing direction. Further, vector $E_u$ is a unit vector of vector E, and is obtained by the following equation (5).

$$\vec{E}_u = \frac{\vec{E}}{|\vec{E}|} \quad (5)$$

The autonomous following vector generator also generates a speed vector $V_H$ related to a height direction of the following probe as shown in the following equation (6).

$$\vec{V}_H = V_h \cdot (C_h - Z_h) \cdot \vec{H}_h \quad (6)$$

In this example, $V_h$ is a parameter for controlling the speed in the height direction. $C_h$ is a Z axis coordinate value in a central location of the gauge head 100. $Z_h$ is a Z axis coordinate of the constraint plane S which is a target value of the height direction. Further, vector $H_h$ is a vector parallel to the surface of the measured object 110, having size 1 in the Z axis direction. Vector $H_h$ is obtained in the following equations (7) and (8).

$$\vec{H}_h = \frac{\vec{H}_u}{(\vec{H}_u, \vec{Z}_u)} \quad (7)$$

$$\vec{H}_u = \vec{P}_u \times \vec{E}_u \quad (8)$$

In the above equation (7), the operator (,) is an inner product of the vector. Accordingly, vector $H_h$ is a value dividing vector $H_u$ by the inner product of vector $H_u$ and unit vector $Z_u$ in the Z axis direction. Vector $H_u$ is an outer product of vector $P_u$ and vector $E_u$.

Further, as shown in the following equation (9), the autonomous following vector generator generates speed vector $V_C$ by combining each of speed vectors $V_P$, $V_E$, and $V_H$, $V_C$ being related to the following direction in order to move the gauge head 100 along the surface of the measured object 110.

$$\vec{V}_C = \vec{V}_P + \vec{V}_E + \vec{V}_H \quad (9)$$

The motion controller moves the gauge head 100 along the surface of the measured object 110, based on the speed vector $V_C$ generated by the autonomous following vector generator.

[Related Art 1] Japanese Laid Open Patent Publication 2005-345123

However, in the 3D measuring apparatus described in Related Art 1, the speed vector $V_H$ related to the height direction of the following probe is generated, as illustrated in equation (6), based on the difference between $Z_h$, which is a Z axis coordinate value on the constraint plane S (target value in the height direction); and $C_h$, which is a Z axis coordinate value in the center of the gauge head 100. Therefore, there is a case where the contact point location of the surface of the measured object 110 and the gauge head 100 does not exist on the constraint plane S.

FIG. 5 illustrates a state where the gauge head 100 is moved along a surface of a measured object 120 having a circular cone shape. Specifically, the motion controller generates speed vector $V_H$ related to the height direction of the following probe, based on the difference $Z_h$, which is a Z axis coordinate value on the constraint plane S; and $C_h$ which is a Z axis coordinate value of a center C of the gauge head 100. Accordingly, as shown in FIG. 5, the gauge head 100 is moved along the surface of the measured object 120 by moving the center C of the gauge head 100 on the constraint plane S. In this example, the surface of the measured object 120 having the circular cone shape is inclined with respect to the Z axis. Therefore, the location of the contact point A, the contact being between the surface of the measured object 110 and the gauge head 100, does not exist on the constraint plane S. Therefore, the 3D measuring apparatus measures the shape of the measured object 120 defined by the locus LA of the contact point A (solid line in FIG. 5), but not defined by the locus LS (two-dotted chain line in FIG. 5), which is the point to be measured.

FIG. 6 illustrates a state where the gauge head 100 is moved along a surface of a measured object 130 having a circular cylindrical shape. Also as shown in FIG. 6, even when measuring the cylindrical measured object 130 having a surface not inclining with respect to the Z axis, there is a problem where the constraint plane S is inclined with respect to the Z axis. Specifically, the 3D measuring apparatus measures the shape of the measured object 130 defined by the locus LA of the contact point A (solid line in FIG. 6), but not defined by the locus LS (two-dotted chain line in FIG. 6), which is the point to be measured. In other words, the 3D measuring apparatus according to Related Art 1 cannot always measure the shape of the measured object by contacting the gauge head on the point to be measured.

SUMMARY OF THE INVENTION

The present invention provides a shape measuring apparatus that can measure a shape of a measured object by securely contacting a gauge head on a point to be measured.

The shape measuring apparatus according to the present invention includes: a probe that has a gauge head contacting a measured object, and is configured to move the gauge head within a predetermined area; a motion mechanism that moves the probe; and a controller that controls the motion mechanism. A shape of the measured object is measured by moving the gauge head along a surface of the measured object while the gauge head is pressed against the measured object. The controller includes: a contact point obtainer that obtains a contact point location of the surface of the measured object and the gauge head; and a motion commander that calculates a location command value causing the motion mechanism to move the probe, based on the contact point location.

With the above-described configuration, the shape measuring apparatus is provided with the motion commander that calculates a location command value causing the motion mechanism to move the probe, based on the contact point location obtained by the contact point obtainer. Therefore, it is possible to measure the shape of the measured object by securely contacting the gauge head on the point to be measured.

According to the present invention, it is preferable that the gauge head has a spherical shape, and the contact point obtainer calculates and obtains the contact point location based on: a central location of the gauge head; a radius of the gauge head; and a normal direction of the contact point.

With the above-described configuration, the contact point obtainer can calculate and obtain the contact point location. Therefore, it is possible to obtain advantages similar to the above-described shape measuring apparatus.

According to the present invention, it is preferable that the contact point obtainer calculates the normal direction of the contact point based on a swing amount of the gauge head.

The normal direction of the contact point is regarded as a swing direction of the gauge head when the gauge head is pressed against the measured object. Further, the swing direction of the gauge head can be calculated based on the swing amount of the measured amount. Therefore, according to the present invention, the contact point obtainer calculates the normal direction of the contact point based on the swing amount of the gauge head. Therefore, it is possible to obtain the location of the contact point with a configuration similar to the conventional shape measuring apparatus.

According to the present invention, it is preferable that the controller has a measured value calculator that calculates a measured value based on a movement amount of the motion mechanism and the contact point location.

In the 3D measuring apparatus described in Related Art 1, the shape of the measured object is measured by moving the gauge head along the surface of the measured object, based on the central location of the gauge head. The 3D measuring apparatus then obtains the central location of the gauge head as a measured value and corrects the measured value using a radius of the gauge head. According to the present invention, however, the shape measuring apparatus has the measured value calculator that calculates the measured value based on the movement amount of the motion mechanism and the contact point location obtained by the contact point obtainer. Therefore, it is possible to obtain the measured value without correction, thereby shortening the measuring time.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
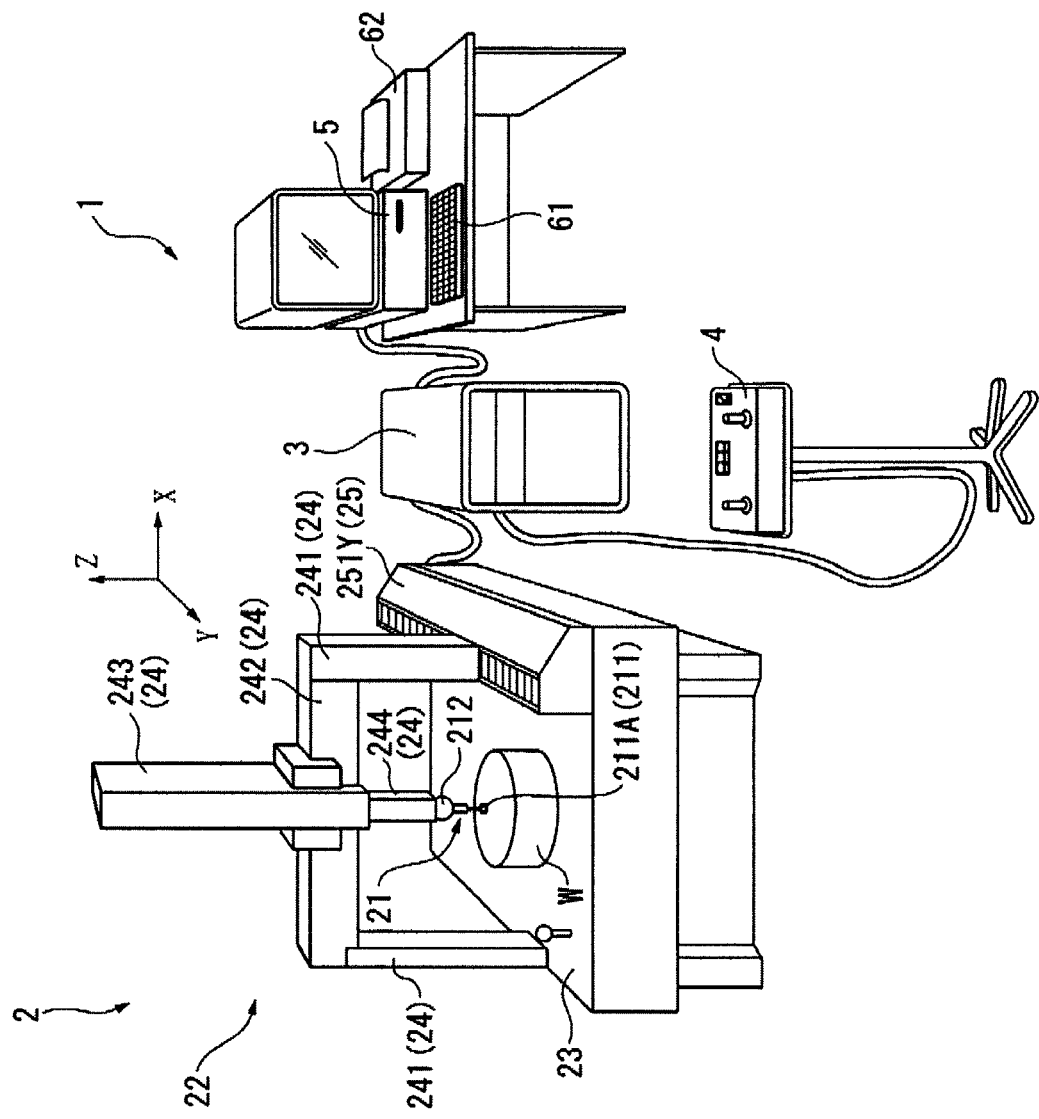
FIG. 1 is a schematic diagram illustrating an entire 3D measuring apparatus according to an embodiment of the present invention.
Figure 2:
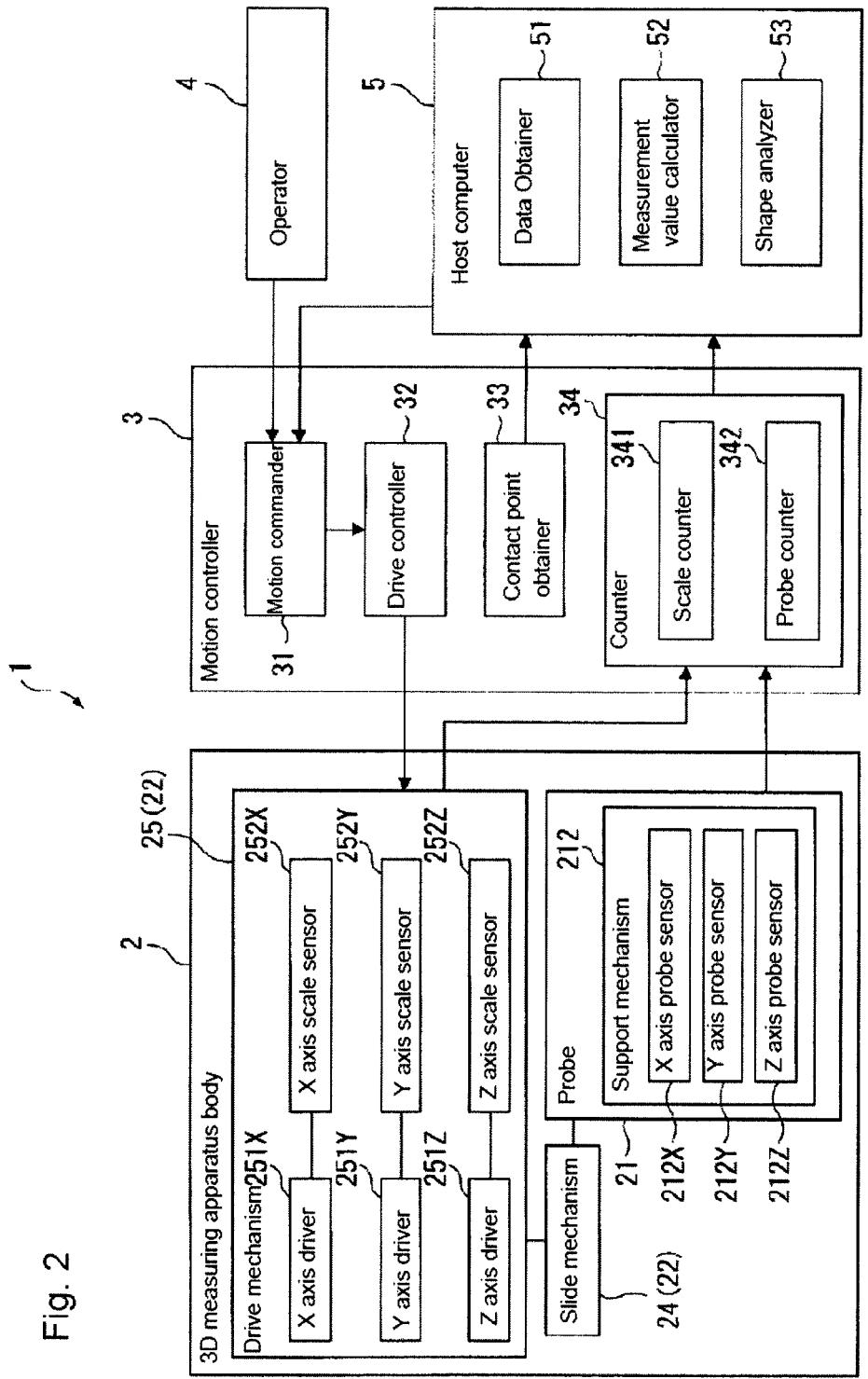
FIG. 2 is a block diagram illustrating a general configuration of the 3D measuring apparatus according to the embodiment of the present invention.

An embodiment of the present invention is describe as follow, with reference to the drawings. FIG. 1 is a schematic diagram illustrating an entire 3D measuring apparatus 1 according to an embodiment of the present invention. FIG. 2 is a block diagram illustrating a general configuration of the 3D measuring apparatus 1. In FIG. 1, an upward direction is a positive Z axis direction. Two axes that intersect perpendicular with the Z axis are X axis and Y axis.

As shown in FIG. 1, the 3D measuring apparatus 1 as a shape measuring apparatus has a 3D measuring apparatus main body 2, a motion controller 3, an operator 4, a host computer 5, and an input unit 61 and an output unit 62. The motion controller 3 executes a drive control of the 3D measuring apparatus main body 2. The operator 4 gives a command to the motion controller 3 via an operation lever and the like, and manually operates the 3D measuring apparatus main body 2. The host computer 5 gives a predetermined command to the motion controller 3, and executes an operation, such as a shape analysis, of a measured object W placed on the 3D measuring apparatus main body 2. The input unit 61 and output unit 62 are connected to the host computer 5. The input unit 61 inputs, to the host computer 5, a measuring condition and the like for the 3D measuring apparatus 1. The output unit 62 outputs a measuring result of the 3D measuring apparatus 1. In this embodiment, the motion controller 3 and the host computer 5 configure a control apparatus.

The 3D measuring apparatus main body 2 has a probe 21, a motion mechanism (also referred to as a mover) 22, and a surface table 23. The probe 21 has a spherical shape gauge head 211A that measures the measured object W. The motion mechanism 22 holds and moves the probe 21. The motion mechanism 22 stands on the surface table 23. The probe 21 has a stylus 211 and a support mechanism 212. The stylus 211 is provided with the gauge head 211A on a distal end thereof (negative direction of the Z axis). The support mechanism 212 supports a proximal end side of the stylus 211 (positive direction of the Z axis).

The support mechanism 212 biases the stylus 211 in the X, Y, and Z axis directions and supports the stylus 211 at a predetermined location. When an external force is applied, i.e., when the gauge head 211A contacts the measured object W, the stylus 211 is held movable within a predetermined area, in each of the X, Y, and Z axis directions. In other words, the support mechanism 212 movably holds the gauge head 211A in a predetermined area. As shown in FIG. 2, the support mechanism 212 has an X axis probe sensor 212X, a Y axis probe sensor 212Y, and a Z axis probe sensor 212Z that detect a location of the stylus 211 in each of the axis directions. In addition, the probe sensors 212X, 212Y, and 212Z are location sensors that output pulse signals according to the movement amount of the stylus 211 in each of the axis directions.

The motion mechanism 22 includes a slide mechanism 24 and a drive mechanism 25. The slide mechanism 24 holds the probe 21 and enables slide movements of the probe 21. The drive mechanism 25 moves the probe 21 by driving the slide mechanism 24. The slide mechanism 24 includes two columns 241, a beam 242, a slider 243, and a ram 244. The two columns 241 are provided on both ends in the X axis direction on the surface table 23, extending in the positive Z axis direction, and being provided slidably in the Y axis direction. The beam 242 is held by the columns 241 and extends along the X axis direction. The slider 243 is formed into a column shape extending along the Z axis direction and is provided slidable on the beam 242 along the X axis direction. The ram 244 is inserted into the slider 243 and is provided slidable inside the slider 243 along the Z axis direction.

As shown in FIGS. 1 and 2, the drive mechanism 25 includes a Y axis driver 251Y, an X axis driver 251X (not shown in FIG. 1), and a Z axis driver 251Z (not shown in FIG. 1). The Y axis driver 251Y supports one of the columns 241 on the positive Z axis direction side and slides the column in the Y axis direction. The X axis driver 251X slides and moves the slider 243 on the beam 242 along the X axis direction. The Z axis driver 251Z slides the ram 244 in the slider 243 and moves the ram 244 in the Z axis direction.

As shown in FIG. 2, the X axis driver 251X, the Y axis driver 251Y, and the Z axis driver 251Z are provided with an X axis scale sensor 252X, a Y axis scale sensor 252Y, and a Z axis scale sensor 252Z, respectively, in order to detect locations of the slider 243, the columns 241, and the ram 244 in axis directions. Each of the X axis scale sensor 252X, the Y axis scale sensor 252Y, and the Z axis scale sensor 252Z is a location sensor that outputs pulse signals according to the movement amount of the slider 243, the columns 241 and the ram 244.

As shown in FIG. 2, the motion controller 3 includes a motion commander 31, a drive controller 32, a contact point obtainer 33, and a counter 34. The motion commander 31 calculates a location command value for moving the probe 21. The drive controller 32 moves the probe 21 by controlling the drive mechanism 25, based on the location command value calculated by the motion commander 31. The contact point obtainer 33 obtains a contact point location of the surface of the measured object W and the gauge head 211A. The counter 34 counts up pulse signals output from each of the scale sensors 252X, 252Y, and 252Z and from each of the probe sensors 212X, 212Y, and 212Z.

The counter 34 includes a scale counter 341 and a probe counter 342. The scale counter 341 counts the pulse signals output from the scale sensors 252X, 252Y, and 252Z, and measures a movement amount $(S_X, S_Y, S_Z)$ of the slide mechanism 24. The probe counter 342 counts the pulse signals output from the probe sensors 212X, 212Y, and 212Z, and measures a movement amount of the stylus 211, i.e., swing amount of the of the gauge head 211A $(E_X, E_Y, E_Z)$. In addition, the movement amount of the slide mechanism 24 is adjusted to indicate the central location of the gauge head 211A, when there is completely no movement of the stylus 211 in the support mechanism 212, i.e., when the swing amount of the gauge head 211A is 0.

Based on a command from the operator 4 or the host computer 5, the motion commander 31 calculates the location command value for moving the gauge head 211A along the surface of the measured object W while the gauge head 211A is pressed against the measured object W. Specifically, the motion commander 31 generates a speed vector $V_C$, based on the above described equations (1)-(5) and (7)-(9), and the following equation (10) used instead of the above-described equation (6). Speed vector $V_C$ is used to calculate a location command value.

$$\vec{V}_H = V_h \cdot (A_h - Z_h) \cdot \vec{H}_h \quad (10)$$

In the above-described equation (10), $A_h$ is a Z axis coordinate value of the contact point A obtained by the contact point obtainer 33. The following illustration uses the previously described measured object 120 as an example to explain how the contact point obtainer 33 obtains the contact point A.

Figure 3:
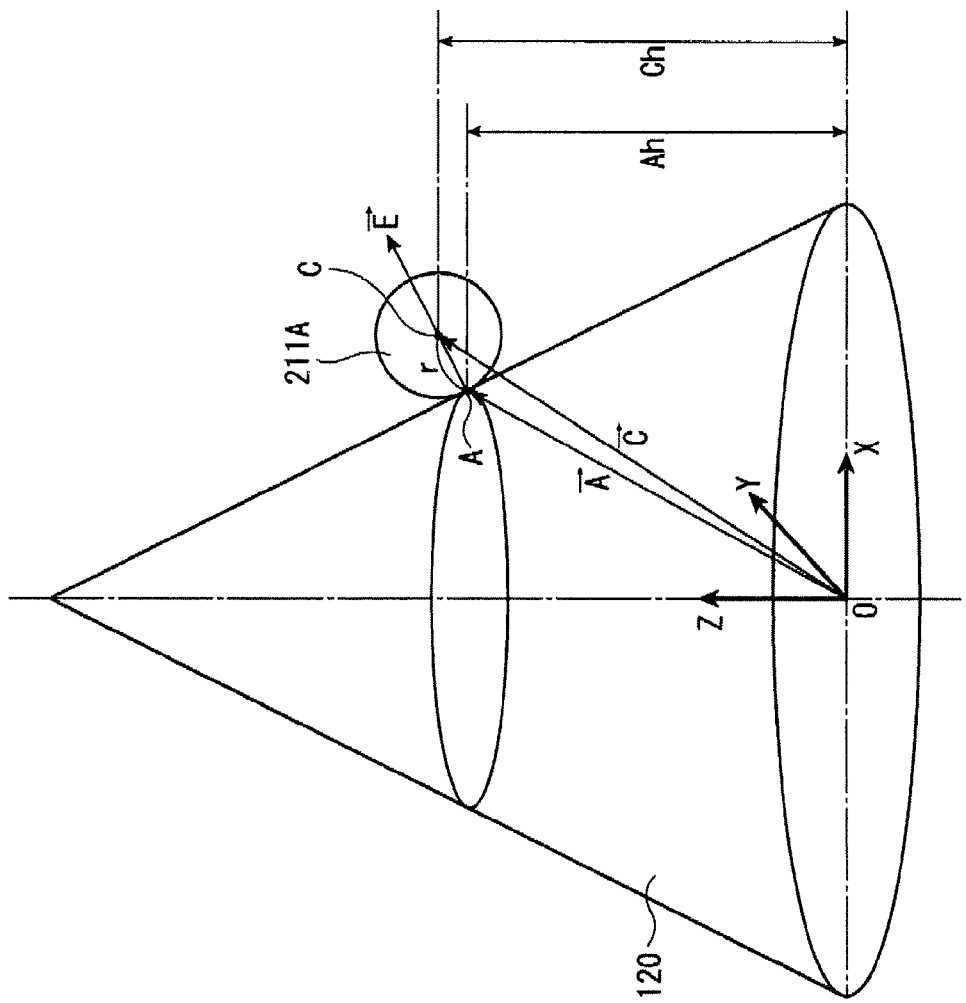
FIG. 3 illustrates a state where a gauge head is moved along a surface of a measured object having a circular cone shape according to the embodiment of the present invention.
Figure 4:
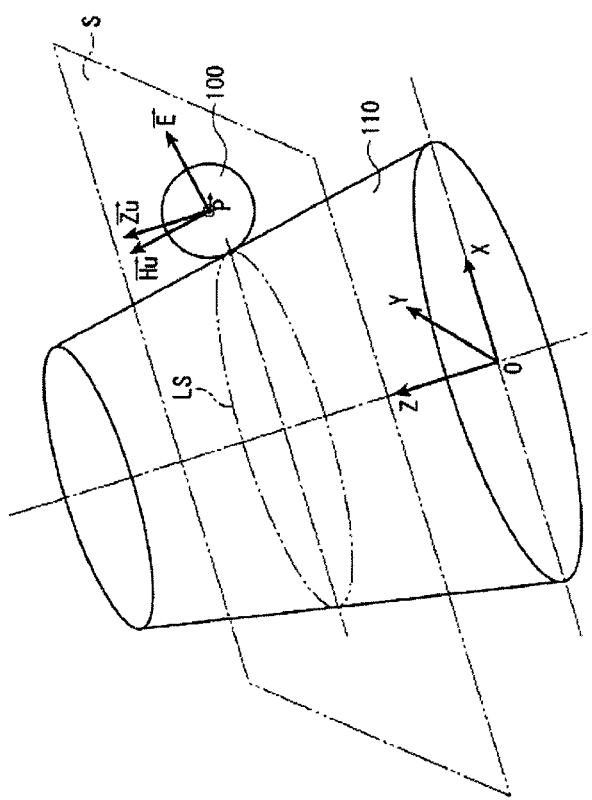
FIG. 4 illustrates a state where a gauge head is moved along a surface of a measured object having a circular truncated cone shape.
Figure 5:
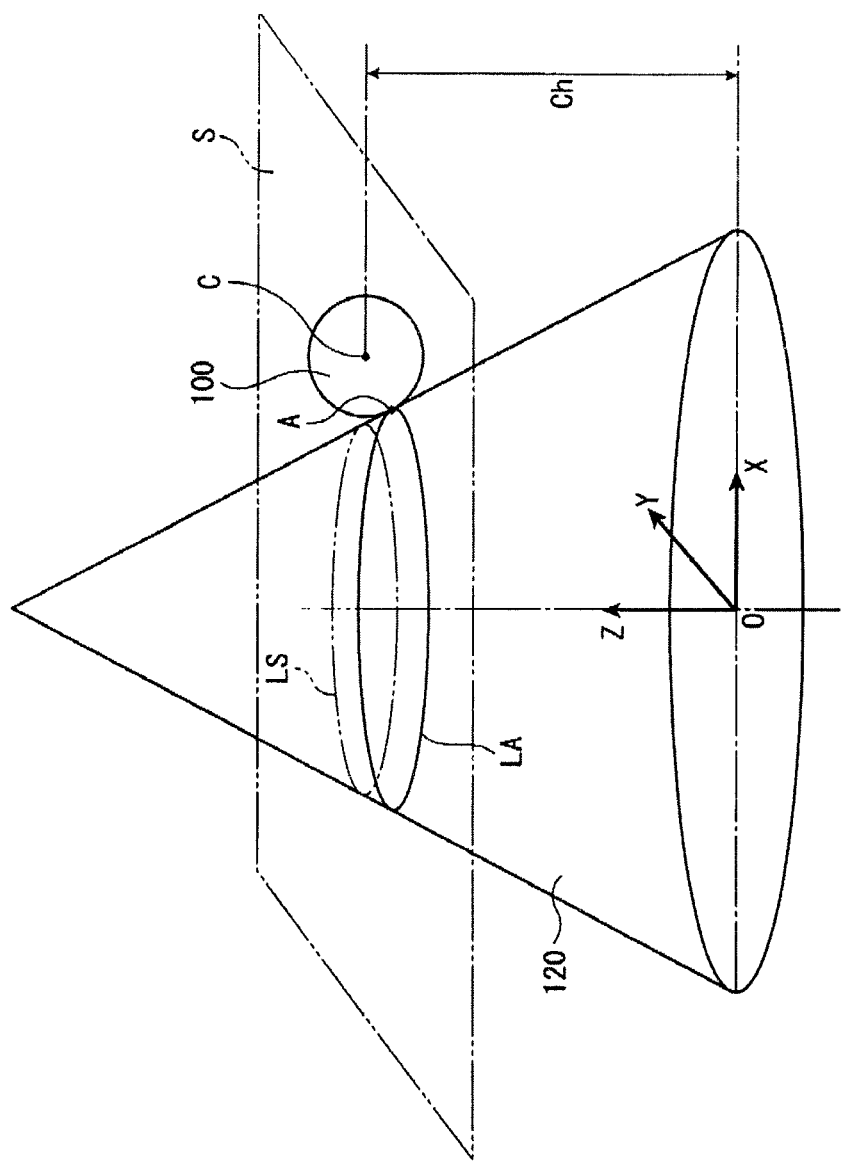
FIG. 5 illustrates a state where a gauge head is moved along a surface of a measured object having a circular cone shape.
Figure 6:
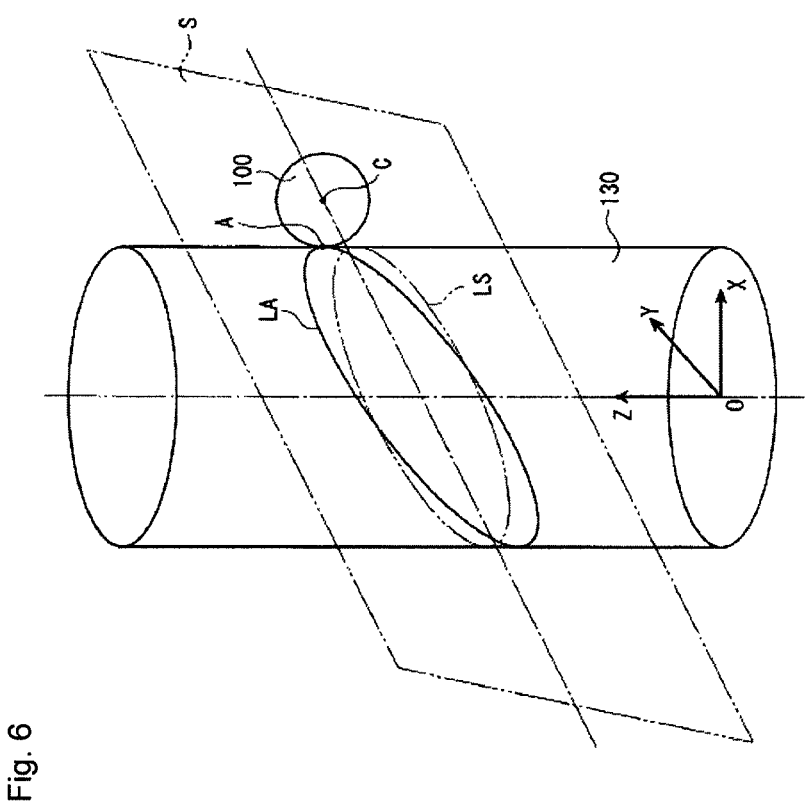
FIG. 6 illustrates a state where a gauge head is moved along a surface of a measured object having a circular cylindrical shape.

FIG. 3 illustrates a state where the gauge head 211A is moved along the surface of the measured object 120 having a circular cone shape. Since the gauge head 211A has a spherical shape, the location of the contact point A of the surface of the measured object 120 and the gauge head 211A can be calculated, as shown in FIG. 3, based on the central location C of the gauge head 211A, a radius r of the gauge head 211A, and a normal direction of the contact point A. Further, the normal direction of the contact point A can be considered as a swing direction of the gauge head 211A, when the gauge head 211A is pressed against the measured object 120. Thus, the swing direction of the gauge head 211A is calculated based on the swing direction of the gauge head 211A ($E_X$, $E_Y$, $E_Z$).

Accordingly, in the present embodiment, the contact point obtainer 33 calculates the normal direction of the contact point A based on the swing direction of the gauge head 211A, and then calculates the location of the contact point A based on the central location C of the gauge head 211A, the radius r of the gauge head 211A, and the normal direction of the contact point A. Further, in some cases, the normal direction of the contact point A cannot be considered as the swing direction of the gauge head 211A, due to a friction between the gauge head 211A and the measured object 120. Therefore, the present embodiment employs an invention disclosed in Japanese Patent Laid Open Application No. S63-131016, in order to reduce the friction effect between the gauge head 211A and the measured object 120.

Specifically, the contact point obtainer 33 obtains the location of the contact point A is based on the following equation (11), by generating a coordinate system for measuring the shape of the measured object 120 having a Z axis, which is a central axis of the measured object 120, and an X and a Y axes that intersect perpendicular with the Z axis; and by calculating with vector C based on the movement amount of the slide mechanism 24 illustrating the central location C of the gauge head 211A; vector E based on the swing amount of the gauge head 211A, and vector A illustrating the location of the contact point A.

$$\vec{A} = \vec{C} - r \cdot \frac{\vec{E}}{|\vec{E}|} \quad (11)$$

The host computer 5 is configured with a CPU (Central Processing Unit), memory, and the like, and controls the 3D measuring apparatus main body 2 by giving a predetermined command to the motion controller 3. The host computer 5 includes a data obtainer 51, a measurement value calculator 52, and a shape analyzer 53. The data obtainer 51 obtains the movement amount of the slide mechanism 24 measured by the scale counter 341 and the location of the contact point A obtained by the contact point obtainer 33 at a predetermined sampling interval. The measured value calculator 52 calculates the measured value based on the movement amount of the slide mechanism 24 and the location of the contact point A obtained by the data obtainer 51. The shape analyzer 53 calculates the surface shape data of the measured object W based on the measured value calculated by the measured value calculator 52; and performs a shape analysis to obtain an error/distortion of the calculated surface shape data of the measured object W.

The following advantages are obtained with the above-described embodiment.

(1) The 3D measuring apparatus 1 includes a motion commander 31 that calculates a location command value for the motion mechanism 22 to move the probe 21, based on the location of the contact point obtained by the contact point obtainer 33. Therefore, the 3D measuring apparatus 1 can measure the shape of the measured object W by securely contacting the gauge head 211A on the point to be measured.

(2) The contact point obtainer 33 calculates a normal direction of the contact point A based on the swing amount of the gauge head 211A, thus is able to obtain the location of the contact point A with a configuration similar to the conventional shape measuring apparatus.

(3) The 3D measuring apparatus 1 includes the measurement value calculator 52 that calculates a measurement value based on the movement amount of the motion mechanism 22 and the location of the contact point obtained by the contact point obtainer 33. Therefore, it is possible to obtain the measurement value without correction, thus shortening the measurement time.

The present invention is not limited to the above-described embodiment, and variations and modifications may be possible without departing from the scope of the present invention. For example, in the above-described embodiment, the contact point obtainer 33 calculates the normal direction of the contact point A based on the swing direction of the gauge head 211A, and then calculates the location of the contact point A based on the central location C of the gauge head 211A, the radius r of the gauge head 211A, and the normal direction of the contact point A. In contrast, the contact point obtainer may detect the normal direction of the contact point by using a sensor, and then calculate the location of the contact point based on the central location of the gauge head, the radius of the gauge head, and the normal direction of the contact point. Further, the contact point obtainer may directly detect the location of the contact point using a sensor. In other words, as long as the contact point obtainer is configured to obtain the location of the contact point, the advantages of the present invention can be achieved. Further, although the gauge head 211A has the spherical shape in the present embodiment, the gauge head 211A may have a different shape, such as a semi-spherical shape.

The 3D measuring apparatus 1 includes the measurement value calculator 52 that calculates a measurement value based on the movement amount of the slide mechanism 24 and the location of the contact point A obtained by the contact point obtainer 33. However, the measurement value maybe calculated based on the movement amount of the slide mechanism 24 and the swing amount of the gauge head 211A, which may be then corrected by the radius r of the gauge head 211A. Further, the present embodiment employs the measured object 120 having a circular cone shape as an example. However, the measured object may be of any shape.

The present invention can be advantageously utilized in a shape measuring apparatus.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

What is claimed is:

1. A shape measuring apparatus comprising:
    a probe having a gauge head configured to contact a measured object, the probe configured to move the gauge head within a predetermined area;
    a mover configured to move the probe; and
    a controller configured to control the mover, wherein:
        a shape of the measured object is measured by moving the gauge head along a surface of the measured object while the gauge head is pressed against the measured object, and the controller comprises:
            a contact point obtainer configured to obtain a contact point location of the surface of the measured object and the gauge head; and
            a motion commander configured to calculate, based on the contact point location, a location command value of a speed vector causing the mover to move the probe along the surface of the object.

2. The shape measuring apparatus according to claim 1, wherein the gauge head has a spherical shape, and the contact point obtainer calculates and obtains the contact point location based on:
    a central location of the gauge head;
    a radius of the gauge head; and
    a normal direction of the contact point.

3. The shape measuring apparatus according to claim 2, wherein the contact point obtainer calculates the normal direction of the contact point based on a swing amount of the gauge head.

4. The shape measuring apparatus according to claim 1, wherein the controller comprises a measured value calculator that calculates a measured value based on a movement amount of the mover and the contact point location.

5. The shape measuring apparatus according to claim 2, wherein the controller comprises a measured value calculator that calculates a measured value based on a movement amount of the mover and the contact point location.

6. The shape measuring apparatus according to claim 3, wherein the controller comprises a measured value calculator that calculates a measured value based on a movement amount of the mover and the contact point location.

7. A shape measuring apparatus comprising:
    a probe having a gauge head configured to contact a measured object, the probe configured to move the gauge head within a predetermined area;
    a mover configured to move the probe; and
    a controller configured to control the mover, wherein:
        a shape of the measured object is measured by moving the gauge head along a surface of the measured object while the gauge head is pressed against the measured object, and
        the controller comprises:
            a contact point obtainer configured to obtain a contact point location of the surface of the measured object and the gauge head; and
            a motion commander configured to calculate, based on the contact point location, a location command value causing the mover to move the probe,
    wherein the gauge head has a spherical shape, and the contact point obtainer calculates and obtains the contact point location based on:
        a central location of the gauge head;
        a radius of the gauge head; and
        a normal direction of the contact point.

8. The shape measuring apparatus according to claim 7, wherein the contact point obtainer calculates the normal direction of the contact point based on a swing amount of the gauge head.

* * * * *